United States Patent
Swinkels et al.

(10) Patent No.: US 12,497,292 B2
(45) Date of Patent: Dec. 16, 2025

(54) SYSTEM AND METHOD FOR HYDROGEN PRODUCTION BY DEHYDROGENATION OF FORMIC ACID

(71) Applicant: DENS B.V., Helmond (NL)

(72) Inventors: Martinus Arnoldus Petrus Maria Swinkels, Helmond (NL); Max Joannes Robertus Aerts, Helmond (NL)

(73) Assignee: DENS B.V., Helmond (NL)

(*) Notice: Subject to any disclaimer, the term of this patent is extended or adjusted under 35 U.S.C. 154(b) by 712 days.

(21) Appl. No.: 17/779,373

(22) PCT Filed: Dec. 2, 2020

(86) PCT No.: PCT/NL2020/050751
§ 371 (c)(1),
(2) Date: May 24, 2022

(87) PCT Pub. No.: WO2021/112671
PCT Pub. Date: Jun. 10, 2021

(65) Prior Publication Data
US 2022/0411263 A1    Dec. 29, 2022

(30) Foreign Application Priority Data
Dec. 2, 2019 (NL) ..................................... 2024350

(51) Int. Cl.
*C01B 3/22* (2006.01)
*B01J 8/00* (2006.01)
(Continued)

(52) U.S. Cl.
CPC ................. *C01B 3/22* (2013.01); *B01J 8/003* (2013.01); *B01J 8/008* (2013.01); *B01J 8/085* (2013.01);
(Continued)

(58) Field of Classification Search
CPC ... B01J 8/00; B01J 8/0015; B01J 8/003; B01J 8/008; B01J 8/08; B01J 8/085;
(Continued)

(56) References Cited

U.S. PATENT DOCUMENTS 4,996,035 A * 2/1991 Stepaniuk ........... C01B 21/0842
423/386
2013/0004800 A1    1/2013 Nakahara
(Continued)

OTHER PUBLICATIONS

International Search Report and Written Opinion for PCT/NL2020/050751, mailed Mar. 1, 2021 (10 pages).
(Continued)

*Primary Examiner* — Natasha E Young
(74) *Attorney, Agent, or Firm* — KDW Firm PLLC

(57) ABSTRACT

The system includes a reactor vessel having a reactor space bound by a reactor wall. The reactor vessel is arranged for holding a mixture of a catalyst and formic acid in the reactor space. The reactor vessel includes a mixture inflow opening for allowing the mixture to enter the reactor space and a mixture outflow opening for allowing said mixture to exit the reactor space, and a gas outflow opening for allowing hydrogen originating from the mixture to exit the reactor space. A method for hydrogen production includes: providing the formic acid and the catalyst into the reactor space; withdrawing the mixture from the reactor space; heating and/or cooling the mixture to a predetermined temperature range outside the reactor space; and introducing the heated and/or cooled mixture into the reactor space in a predetermined direction having a tangential component arranged for stirring said mixture in the reactor space.

20 Claims, 2 Drawing Sheets

(51) Int. Cl.
*B01J 8/08* (2006.01)
*B01J 31/16* (2006.01)
*B01J 31/18* (2006.01)

(52) U.S. Cl.
CPC ....... *B01J 31/1691* (2013.01); *B01J 31/1845* (2013.01); *B01J 2208/00176* (2013.01); *B01J 2208/00495* (2013.01); *B01J 2208/00752* (2013.01); *B01J 2208/00761* (2013.01); *B01J 2208/0084* (2013.01); *B01J 2208/00893* (2013.01); *B01J 2219/0295* (2013.01); *B01J 2231/76* (2013.01); *B01J 2531/004* (2013.01); *B01J 2531/005* (2013.01); *B01J 2531/82* (2013.01); *B01J 2531/821* (2013.01); *B01J 2531/96* (2013.01); *C01B 2203/0277* (2013.01); *C01B 2203/1064* (2013.01); *C01B 2203/1211* (2013.01); *C01B 2203/1614* (2013.01)

(58) Field of Classification Search
CPC ........ B01J 31/00; B01J 31/16; B01J 31/1691; B01J 31/18; B01J 31/1845; B01J 2208/00; B01J 2208/00008; B01J 2208/00017; B01J 2208/00106; B01J 2208/00168; B01J 2208/00176; B01J 2208/00477; B01J 2208/00495; B01J 2208/00743; B01J 2208/00752; B01J 2208/00761; B01J 2208/00796; B01J 2208/00823; B01J 2208/00831; B01J 2208/0084; B01J 2208/00893; B01J 2219/00; B01J 2219/02; B01J 2219/025; B01J 2219/0295; B01J 2231/00; B01J 2231/70; B01J 2231/76; B01J 2531/00; B01J 2531/001; B01J 2531/002; B01J 2531/004; B01J 2531/005; B01J 2531/80; B01J 2531/82; B01J 2531/821; B01J 2531/90; B01J 2531/96; C01B 3/00; C01B 3/0005; C01B 3/011; C01B 3/0015; C01B 3/02; C01B 3/22; C01B 2203/00; C01B 2203/02; C01B 2203/0266; C01B 2203/0277; C01B 2203/06; C01B 2203/066; C01B 2203/10; C01B 2203/1041; C01B 2203/1047; C01B 2203/1064; C01B 2203/12; C01B 2203/1205; C01B 2203/1211; C01B 2203/16; C01B 2203/1614

See application file for complete search history.

(56) References Cited

U.S. PATENT DOCUMENTS

2018/0123153 A1  5/2018  Sasson et al.
2018/0337416 A1  11/2018  Huang et al.

OTHER PUBLICATIONS

Siek et al., "Iridium and Ruthenium Complexes of N-Heterocyclic Carbene- and Pyridinol-Derived Chelates as Catalysts for Aqueous Carbon Dioxide Hydrogenation and Formic Acid Dehydrogenation: The Role of the Alkali Metal", Organometallics 36(6):1091-1106 (2017). DOI: 10.1021/acs.organomet.6b00806.

* cited by examiner

SYSTEM AND METHOD FOR HYDROGEN PRODUCTION BY DEHYDROGENATION OF FORMIC ACID

This application is a national stage filing under 35 U.S.C. 371 of pending International Application No. PCT/NL2020/050751, WO 2021/112671, filed Dec. 2, 2020, which claims priority to Netherlands Patent Application No. 2024350, filed Dec. 2, 2019, the entirety of which applications are incorporated by reference herein.

According to the first aspect, the present disclosure relates to a system for hydrogen production by dehydrogenation of formic acid.

According to the second aspect, the present disclosure relates to a method for hydrogen production by hydrogenation of formic acid using a system according to the first aspect of the present disclosure.

Hydrogen gas, $H_2$, is a versatile source of energy and an important starting material for many chemical reactions. As an energy source hydrogen can be used in fuel cells. It is known that a catalyst provided in the fuel cells may be negatively affected by carbon monoxide. For this reason it is beneficial to be able to produce relative pure hydrogen.

SUMMARY

The objective of the present disclosure is to provide a system and a method for producing relative pure hydrogen from formic acid.

The objective is realised by the system according to the first aspect of the present disclosure. The system according to the first aspect comprises a reactor vessel comprising a reactor space bound by a reactor wall, wherein said reactor vessel is arranged for holding a mixture of a catalyst and said formic acid in said reactor space, said reactor vessel further comprising a mixture inflow opening for allowing said mixture to enter, via said mixture inflow opening, said reactor space and a mixture outflow opening for allowing said mixture to exit, via said mixture outflow opening, said reactor space, and a gas outflow opening for allowing hydrogen originating from said mixture, via said gas outflow opening, to exit said reactor space.

The system may comprise an inflow conduit, communicatively coupled for fluid flow, via said mixture inflow opening, to said reactor space, wherein said inflow conduit is arranged such that said mixture, in use, is introduced in said reactor space, via said mixture inflow opening, in a predetermined direction having a tangential component, preferably arranged for stirring and/or mixing, in use, said mixture in said reactor space.

The system is provided with a pump, communicatively coupled for fluid flow, via said mixture inflow opening and said mixture outflow opening, to said reactor space, wherein said pump is arranged for withdrawing, via said mixture outlet opening, said mixture from said reactor space and introducing, via said inflow conduit, said mixture into said reactor space.

The system comprises a temperature control arrangement, communicatively coupled for fluid flow to said pump, wherein said temperature control arrangement is arranged outside the reactor space for heating and/or cooling, in use, said mixture withdrawn from said reactor space to a predetermined temperature range, preferably a predetermined temperature, outside the reactor space before introducing, via said inflow conduit, said mixture into said reactor space.

The present disclosure relies at least partly on the insight that a relative accurate control of the temperature of formic acid and the catalyst is beneficial for realising a relative low rate of CO generation and thereby producing relative pure hydrogen from formic acid. A relative high temperature of the mixture may result in a relative large CO generation rate. By providing the system according to the first aspect of the present disclosure with the pump and the temperature control arrangement outside the reactor space, a relative uniform temperature of the mixture in the system may be realised. This effect is obtained by heating and/or cooling the mixture outside the reactor space and re-introducing the mixture after the mixture is at the predetermined temperature in a continuous or batch-wise manner. In this way relative high local temperatures of the mixture that may be present when heating the reactor vessel when providing a heating means in the reactor space may be avoided.

Preferably, a volume of said temperature control arrangement for holding said mixture during heating and/or cooling is smaller than a volume of said reactor vessel. A relative small volume of the temperature control arrangement for holding said mixture during heating and/or cooling is beneficial for avoiding, or at least significantly reducing the risk, of relative large temperature variations of the mixture in the system and thereby produce relative pure hydrogen from formic acid.

Preferably, a ratio of said volume of said reactor vessel and said volume of said temperature control arrangement for holding said mixture during heating and/or cooling is in the range of 50 to 500.

Providing the inflow conduit such that said mixture, in use, is introduced in said reactor space, via said mixture inflow opening, in a predetermined direction having a tangential component for stirring, in use, said mixture in said reactor space is beneficial for realising a relative good mixing of the mixture in the reactor space. A relative good mixing is beneficial for avoiding, or at least significantly reducing the risk, of relative large temperature variations of the mixture in the system and thereby produce relative pure hydrogen from formic acid. Moreover, a provision of the inflow conduit avoids the need for providing a mechanic stirrer in the reactor vessel for realising a relative good mixing. Avoiding a mechanic stirrer is beneficial for realising a relative robust and cost effective system.

In particular, stirring according to the invention may be a circulating flow of said mixture inside the reactor vessel and/or within the reactor space. Preferably, stirring is a circulating flow of the said mixture inside the reactor vessel around a substantially central axis of the reactor vessel, such as a vertical axis of the reactor vessel. As such, the predetermined direction having a tangential component is arranged to provide a stirring movement of said mixture inside the reactor space in a substantially circular direction within the reactor space. In this way, a stirring of said mixture within the reactor space is easily obtained while providing and maintaining a substantially uniform temperature of said mixture inside the reactor space.

Preferably, the mixture comprises a solvent for dissolving catalyst. Preferably, the formic acid of said mixture is in a liquid state at the predetermined temperature range.

Preferably, said pump is arranged for displacing a two and/or three phase medium. This is beneficial for allowing the pump to relatively displace the mixture that may comprise a liquid catalyst and hydrogen gas including formic acid in a liquid state. A pump arranged for displacing a three phase medium is beneficial for pumping a mixture that comprises a formic acid in a liquid state, a catalyst being at least partially in a solid state, such as being dispersed in the mixture, and hydrogen gas. The catalyst may be partially in a solid state, such as being dispersed in the mixture, in case the catalyst is not completely dissolved in the formic acid. A lower temperature may exist during start-up of the process for producing relative pure hydrogen from formic acid. Due to the lower temperature of the mixture part of the catalyst may be precipitated and not (yet) completely dissolved in the formic acid.

In this regard, it is beneficial if said pump is a turbine pump, such as a centrifugal pump, or a positive displacement pump.

The turbine pump may be a centrifugal pump, wherein the pumping is done by throwing fluid outward at high speed, or may be an axial-flow pump, wherein alternating rotating and static blades progressively raise the pressure of a fluid.

Preferably, the turbine pump is an axial-flow pump or a regenerative turbine pump.

In an embodiment of the system according to the first aspect, said temperature control arrangement comprises at least one of a heat exchanger, electrical heater and a microwave for cooling and/or heating said mixture.

In a practical embodiment of the system according to the first aspect, said reactor wall comprises a polymer, preferably wherein said reactor wall is made from a polymer, preferably wherein said polymer is a plastic. A polymer, preferably a plastic is beneficial for realising a relative cost efficient system according to the first aspect.

Preferably, said reactor wall comprises a coating arranged for thermally insulating said reactor vessel and/or shielding said mixture from predetermined materials. The coating prevents or at least restricts a temperature loss of said mixture when it is stirred within the reactor vessel.

It is advantageous if said reactor wall comprises replaceable wall elements arranged for realising a locally reinforced surface. The replaceable wall elements may provide a wear surface of the reactor wall to realise a relative long operational life time of the reactor vessel without the need for complete replacement of the reactor vessel when a replaceable wall element is worn.

Preferably, the replaceable wall elements comprise a metal for locally reinforcing the reactor wall.

In an embodiment of the system according to the first aspect of the present disclosure, said replaceable wall element of said replaceable wall elements is coated on a side of said replaceable wall element facing said reactor space with polytetrafluoroethylene for thermally insulating said reactor vessel and/or shielding said mixture from metal of said replaceable wall element that may otherwise degrade said catalyst present in said reactor space.

Preferably, said reactor vessel or said inflow conduit is provided with a further inflow opening arranged for introducing said formic acid in said reactor vessel. Providing the further inflow opening is beneficial for realising a relative continuous dehydrogenation process.

It is beneficial if said reactor vessel comprises an upper side wall, wherein said upper side wall at least partly bounds said reactor space at an upper side thereof, wherein said upper side wall is provided with said gas outflow opening for allowing hydrogen originating from said mixture to exit, via said gas outflow opening, said reactor space. Providing said gas outflow opening in said upper side wall is beneficial for avoiding, or at least reducing, catalyst and/or formic acid to exit the reactor space via the gas outflow opening.

Preferably, said reactor vessel comprises a lower side wall, wherein said lower side wall at least partly bounds said reactor space at a lower side thereof, wherein said mixture outflow opening is provided in said lower side wall. Providing the mixture outflow opening at a lower side of the reactor space is beneficial for avoiding, or at least reducing, hydrogen exiting the reactor space via the mixture outflow opening.

In this regard, it is beneficial if said lower side wall partly bounds said reactor space at a bottom side thereof, wherein said mixture outflow opening is provided in a centre part of said bottom side. Providing the mixture outflow opening in the centre part of the bottom side is beneficial for avoiding, or at least significantly reducing the risk, of relative large temperature variations of the mixture in the reactor space and thereby produce relative pure hydrogen from formic acid. Moreover, providing said mixture outflow opening in the centre part of said bottom side is beneficial for realising a relative good mixing of the mixture in the reactor space. In addition, by providing said mixture outflow opening in the centre part of said bottom side a cyclonic shaped flow in the reactor space may be realised. Such a cyclonic shaped flow is advantageous for separating hydrogen gas from the mixture.

In a practical embodiment of the system according to the first aspect of the present disclosure said reactor vessel is free from a mechanic stirrer. The omission of a mechanic stirrer in the reactor vessel is beneficial for realising a relative robust system while allowing to produce relative pure hydrogen.

Preferably, said temperature control arrangement is provided such that said mixture is heated and/or cooled by said temperature control arrangement after said mixture, in use, passed said pump. Preferably, the heat exchanger is placed after the pump because the mixture will be more reactive after heating thereby extending life time of the pump. In other words, said pump is coupled to said mixture inflow opening via said temperature control arrangement for heating and/or cooling said mixture, in use by said temperature control arrangement, after said mixture passed said pump. Providing the pump and the temperature control arrangement in such a manner is beneficial realising a relative long operational life time of the pump. The present disclosure relies at least partly on the insight that by heating the mixture after said mixture has passed the pump, does allow the pump to operate at a position in the system having a relative low mixture temperature. A relative low mixture temperature is beneficial for realising a relative long operational life time of the pump.

It is beneficial, if said system further comprises a stationary flow organ arranged in said reactor space for disturbing a flow, in use, induced by introduction of said mixture in said reactor space via said inflow conduit, in said reactor space. This is beneficial for realizing a relative good mixing of the mixture in said reactor space. In particular, said flow is a flow of stirring of the said mixture in said reactor space. Said stirring flow is induced by introduction of said mixture in said reactor space via said inflow conduit. The stationary flow organ is arranged to disturb the circulating flow of stirring.

Preferably, said flow organ is provided at or near the reactor wall for disturbing the flow, such as a flow of stirring, of said mixture near the reactor wall. The flow organ is beneficial for realising a relative good mixing of the mixture in the reactor space. A relative good mixing is beneficial for avoiding, or at least significantly reducing the risk, of relative large temperature variations of the mixture in the system and thereby produce relative pure hydrogen from formic acid.

Preferably, said system comprises a control unit, communicatively coupled to said temperature control arrangement and/or said pump, arranged for controlling said temperature control arrangement and/or said pump in dependence of a temperature of said mixture in said reactor space and/or said temperature control arrangement.

In this regard, it is beneficial if said system comprises a measurement unit, communicatively couple to said control unit, arranged for measuring a temperature of said mixture in said reactor space and/or said temperature control arrangement.

Preferably, the control unit, is arranged for controlling said temperature control arrangement and/or said pump in dependence of a temperature measured, by said measurement unit, of said mixture in said reactor space and/or said temperature control arrangement.

It is beneficial if said pump is positioned lower than said reactor space. Positioning the pump at a relative low position is beneficial for avoiding, or at least significantly reducing the risk, that hydrogen originating from the mixture accumulates in the pump. Accumulation of hydrogen in the pump may negatively affect the pumping performance of the pump, thereby reducing a rate of withdrawal of the mixture from the reactor space.

According to the second aspect, the present disclosure relates to a method for hydrogen production by dehydrogenation of formic acid using a system according to the first aspect of the present disclosure. The method comprises the steps of:
prov250ng said formic acid and said catalyst into said reactor space to provide a mixture of said formic acid and said catalyst inside the reactor space;
withdrawing, by said pump, said mixture of said formic acid and said catalyst from said reactor space;
heating and/or cooling, by said temperature control arrangement, said mixture to said predetermined temperature range outside the reactor space, preferably to said predetermined temperature; and
introducing, via said inlet opening, said heated and/or cooled mixture into said reactor space in a predetermined direction having a tangential component arranged for stirring said mixture in said reactor space.

The providing step of said formic acid and said catalyst into said reactor space is to provide a mixture of said formic acid and said catalyst inside the reactor space.

Embodiments of the method correspond to embodiments of the system according to the first aspect of the present disclosure. The advantages of the method correspond to the advantages of the system according to the first aspect of the present disclosure presented previously.

Preferably, said mixture is an aqueous solution comprising a formate salt.

Preferably, said catalyst comprises a complex of the formula:

in which,
M is a metal selected from Ru, Rh, Ir, Pt, Pd, and Os, preferably Ru;
n is in the range of 1-4;
L is a carbene, or a ligand comprising at least one phosphorus atom, said phosphor atom being bound by a complex bond to said metal, the phosphorus ligand further comprising at least an aromatic group and a hydrophilic group, wherein,
if n>1, each L may be different from another L;
wherein the complex of formula (I) optionally comprises other ligands and is provided in the form of a salt or is neutral.

It is advantageous, if said predetermined temperature range is 20-200 degrees Celcius and/or the pressure in said reactor space is in the range of 1-1200 bar. wherein, during said step of heating, said predetermined temperature range is 20-200 degrees Celcius, preferably 70-140 degrees Celcius.

Preferably, a partial pressure of said hydrogen is in the range of 0.5-600 bar.

BRIEF DESCRIPTION OF THE FIGURES

The present disclosure will now be explained by means of a description of a preferred embodiment of a system and a method, in which reference is made to the following schematic figures, in which.

DESCRIPTION OF EMBODIMENTS

Figure 1:
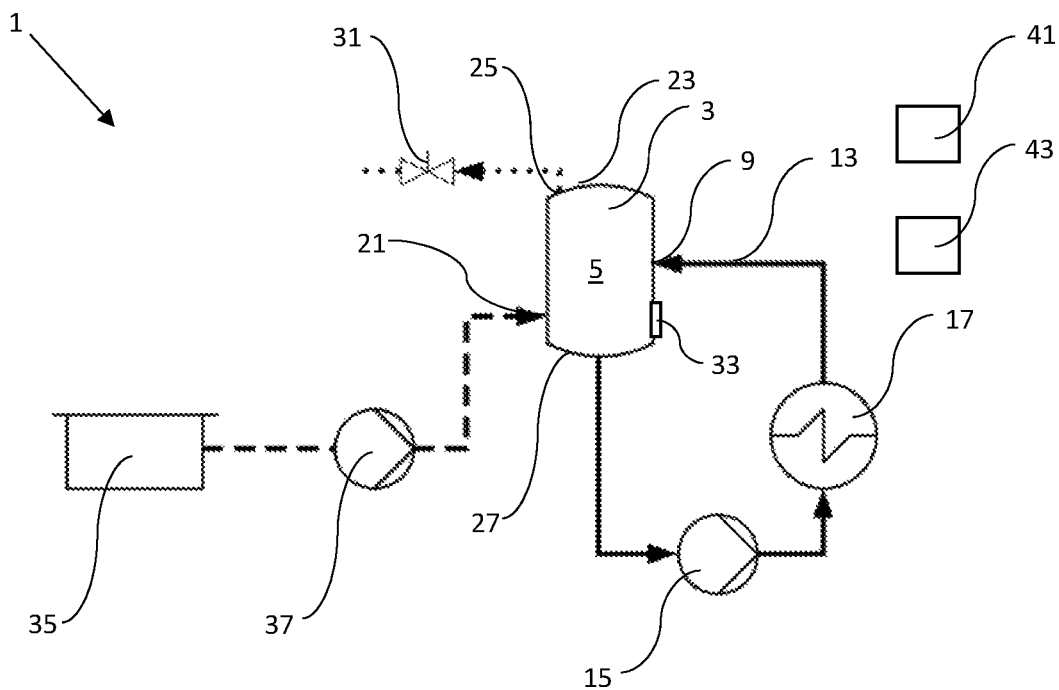
FIG. 1: a system according to the present disclosure is shown.
Figure 2:
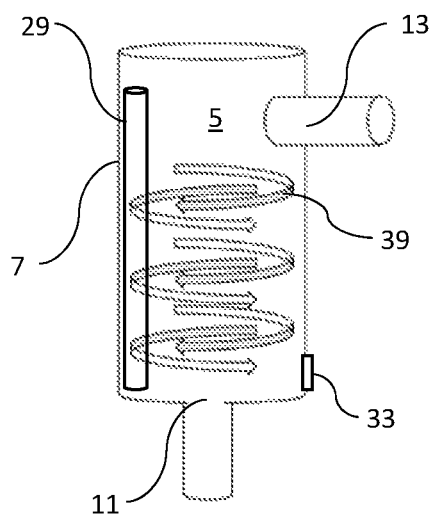
FIG. 2: an element of the system from FIG. 1 is shown.

System 1 is arranged for producing hydrogen by dehydrogenation of formic acid. The system 1 comprises a reactor vessel 3, an inflow conduit 13, a pump 15 and a temperature control arrangement 17. The reactor vessel 3 comprises a reactor space 5 that is bound by a reactor wall 7. The reactor wall 7 comprises a lower side wall 27 and an upper side wall 23. The upper side wall 23 is provided with a gas outflow opening 25 for allowing hydrogen originating from the mixture to exit the reactor space 5 via the gas outflow opening 25. Exiting of the hydrogen from the reactor space 5 may be prevented by a blocking arrangement 31 arranged for in a first condition of the blocking arrangement 31 allow the hydrogen originating from the reactor space 5 to pass the blocking arrangement 31 and in a second condition of the blocking arrangement 31 block exiting of hydrogen from the reactor space 5. The lower side wall 27 comprises a mixture outflow opening 11 that is provided in a centre part of a bottom side of the reactor vessel 3.

The reactor vessel 3 is arranged for holding a mixture of the catalyst and the formic acid in the reactor space 5. The reactor vessel 3 comprises a mixture inflow opening 9 for allowing the mixture to enter the reactor space 5 via the mixture inflow opening 9. In the reactor space 5 a stationary flow organ 29 is provided at or near the reactor wall 7. The flow organ 29 extends along substantially the complete height of the reactor space 5. In an embodiment of the system 1 it is conceivable that the flow organ extends only along a lower half of the height of the reactor space 5. The flow organ 29 is arranged inside the reactor space 5 at a position to alter or disturb the circulating flow of said mixture. In particular, the flow organ 29 may be arranged to restrict the laminating flow of the mixture along or near the reactor wall 7. In this way, the circulation of the mixture inside the reactor space 5 is optimised and/or a vortex formation inside the reactor space 5 is reduced or prohibited.

The reactor vessel 3 is provided with a further inflow opening 21 that is arranged for introducing the formic acid, from a storage 35, in the reactor vessel 3 for forming the mixture. The storage 35 is coupled for fluid flow to the reactor space 5 via a further pump 37. The further pump 37 is arranged for pumping the formic acid from the storage 35 into the reactor space 5.

The reactor wall 7 is comprises a plastic that is coated on a side of the plastic facing the reactor space 5 with polytetrafluoroethylene for thermally insulating the reactor vessel 13 and shielding the mixture from the plastic of the reactor wall 7 that may otherwise degrade the catalyst present in the reactor space 5. The reactor wall 7 further comprises a replaceable wall element 33. The replaceable wall element 33 comprises a metal for locally reinforcing the reactor wall 7. The replaceable wall element 33 is coated on a side of the replaceable wall element 33 facing the reactor space 5 with polytetrafluoroethylene for thermally insulating the reactor vessel 13 and shielding the mixture from the metal of the replaceable wall element 33 that may otherwise degrade the catalyst present in the reactor space 5. In an embodiment of the system 1 it is conceivable that the reactor wall is locally reinforced by a fixed wall element in addition to, or as an alternative of, the replaceable wall element 33.

Figure 3:
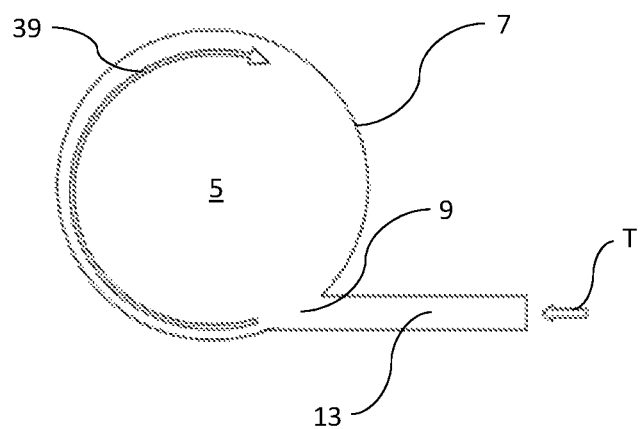
FIG. 3: a top view of an element of the system from FIG. 1 is shown.
Figure 4:
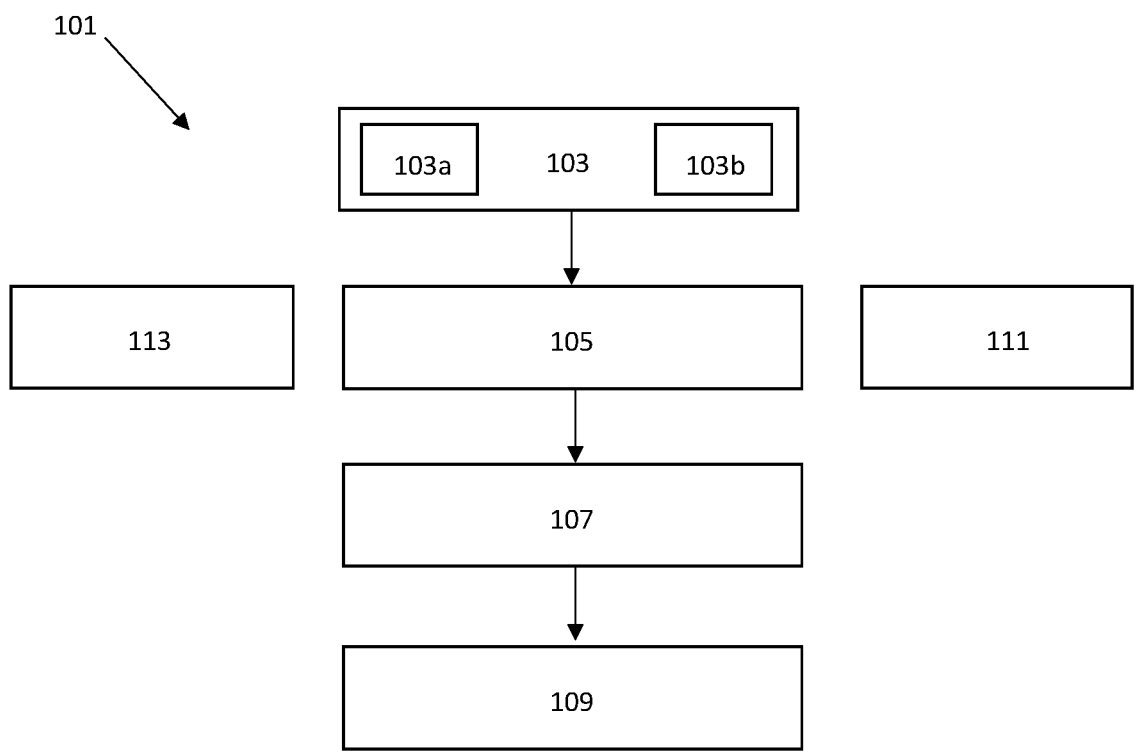
FIG. 4: a method according to the present disclosure is shown.

The inflow conduit 13 is communicatively coupled for fluid flow, via said mixture inflow opening 9, to said reactor space 5. The inflow conduit 13 is arranged such that said mixture, in use, is introduced in said reactor space 5, via said mixture inflow opening 9, in a predetermined direction having a tangential component T for stirring 39, in use, said mixture in said reactor space 5. In other words, the mixture is introduced in a direction along the reactor wall 7, wherein said direction of introduction has the tangential component T. The predetermined direction having a tangential component T is arranged to provide or enhance a stirring flow of said mixture inside the reactor space 5 in a substantially circular direction, such as along the reactor wall 7 (As shown in FIG. 3). In this way, a stirring of said mixture through the reactor space 5 is easily obtained while maintaining a substantially uniform temperature of said mixture inside the reactor space 5. Preferably, the reactor wall 7 has an inner surface, which is substantially circular in a plane parallel to the tangential component T of predetermined direction of introducing said mixture via said mixture inflow opening into said reactor space. In particular, said inner surface may be concave curved to support the stirring movement of said mixture along the reactor wall 7.

The pump 15 is communicatively coupled for fluid flow, via the mixture inflow opening 9 and the mixture outflow opening 11, to the reactor space 5. The pump 15 is arranged for withdrawing, via the mixture outlet opening 11, the mixture from the reactor space 5 and introducing, via the inflow conduit 13 and the inflow opening 9, the mixture into the reactor space 5.

The temperature control arrangement 17 is communicatively coupled for fluid flow to said pump 15 and arranged for heating and/or cooling the mixture withdrawn from the reactor space 5. The temperature control arrangement 17 is arranged outside the reactor space 5. Preferably, the temperature control arrangement 17 is arranged downstream of the pump 15. The temperature control arrangement 17 is further arranged for cooling and/or heating a part of the mixture present in the temperature control arrangement 17 to be cooled and/or heated to a predetermined temperature in the range of 70 to 150 degrees Celcius before introducing, via the inflow conduit 13, the part of the mixture into said reactor space 5.

The system 1 comprises a control unit 41 and a measurement unit 43. The control unit 41 is communicatively coupled to said temperature control arrangement 17, the pump 15 and the measurement unit 43. The control unit 41 is arranged for controlling the temperature control arrangement 17 and the pump 15 in dependence of a temperature of the mixture, in use present in the reactor space 5 and/or the temperature control arrangement 17, measured by the measurement unit 43.

Method 101 is arranged for hydrogen production by dehydrogenation of formic acid. The method 101 comprises the step of providing 103 said formic acid and said catalyst into said reactor space 5. In an embodiment of the method 101, said providing of said formic acid may be executed in a step 103a as part of step 103 and said providing of said catalyst may be executed during a step 103b as part of step 103. In other words the formic acid and the catalyst may be provided in said reactor space 5 during different steps 103a, 103b to allow said formic acid and said catalyst to be stored separately.

The catalyst providing, during said step of providing 103, comprises a complex of the formula

$$M(L)_n \qquad (I)$$

in which,

M is a metal selected from Ru, Rh, Ir, Pt, Pd, and Os, preferably Ru;

n is in the range of 1-4;

L is a carbene, or a ligand comprising at least one phosphorus atom, said phosphor atom being bound by a complex bond to said metal, the phosphorus ligand further comprising at least an aromatic group and a hydrophilic group, wherein, if n>1, each L may be different from another L;

wherein the complex of formula (I) optionally comprises other ligands and is provided in the form of a salt or is neutral.

Method 101 further comprises a step 105 of withdrawing, by said pump 15, said provided catalyst and said formic acid from said reactor space 5. Subsequently, said mixture, withdrawn during said step 105, is heated and/or cooled, during a step 107 of heating and/or cooling, by said temperature control arrangement 17, to said predetermined temperature. During said step 107 of heating and/or cooling, said predetermined temperature is in the range of 70-150 degrees Celcius After said heating and/or cooling during said step 107, said heated and/or cooled mixture is introduced, during a step 109 of introducing, via said inlet opening 9, into said reactor space 5. During the step 109 of introducing, the mixture is introduced into the reactor space 5 in the predetermined direction having the tangential component T arranged for stirring 39, in use, said mixture in said reactor space 5. In other words, the mixture is introduced in a direction along the reactor wall 7, wherein said direction of introduction has the tangential component T.

Method 101 comprises a step 111 of exiting hydrogen, from said reactor space 5, via said gas outflow opening 25. Method 101 may further comprise a step 113 of introducing formic acid during said step 105 of withdrawing, said step 109 of introducing.

The invention claimed is:

1. A system for hydrogen production by dehydrogenation of formic acid (HCOOH), said system comprising:
a reactor vessel comprising a reactor space bound by a reactor wall, wherein said reactor vessel is arranged for holding a mixture of a catalyst and said formic acid in said reactor space, said reactor vessel further comprising a mixture inflow opening for allowing said mixture to enter, via said mixture inflow opening, said reactor space and a mixture outflow opening for allowing said mixture to exit, via said mixture outflow opening, said reactor space, and a gas outflow opening for allowing hydrogen originating from said mixture, via said gas outflow opening, to exit said reactor space;
an inflow conduit, communicatively coupled for fluid flow, via said mixture inflow opening, to said reactor space;
a pump, communicatively coupled for fluid flow, via said mixture inflow opening and said mixture outflow opening, to said reactor space, wherein said pump is arranged for withdrawing, via said mixture outlet opening, said mixture from said reactor space and introducing, via said inflow conduit, said mixture into said reactor space; and
a temperature control arrangement, communicatively coupled for fluid flow to said pump, wherein said temperature control arrangement is arranged outside the reactor space for heating and/or cooling, in use, said mixture withdrawn from said reactor space to a predetermined temperature range before introducing, via said inflow conduit, said mixture into said reactor space;
wherein said pump is at least one of:
arranged for displacing a two and/or three phase medium, and is a turbine pump, a centrifugal pump, or a positive displacement pump;
coupled to said mixture inflow opening via said temperature control arrangement for heating and/or cooling said mixture, in use, by said temperature control arrangement, after said mixture has passed said pump; and
positioned lower than said reactor space.

2. A system for hydrogen production by dehydrogenation of formic acid (HCOOH), said system comprising:
a reactor vessel comprising a reactor space bound by a reactor wall, wherein said reactor vessel is arranged for holding a mixture of a catalyst and said formic acid in said reactor space, said reactor vessel further comprising a mixture inflow opening for allowing said mixture to enter, via said mixture inflow opening, said reactor space and a mixture outflow opening for allowing said mixture to exit, via said mixture outflow opening, said reactor space, and a gas outflow opening for allowing hydrogen originating from said mixture, via said gas outflow opening, to exit said reactor space;
an inflow conduit, communicatively coupled for fluid flow, via said mixture inflow opening, to said reactor space;
a pump, communicatively coupled for fluid flow, via said mixture inflow opening and said mixture outflow opening, to said reactor space, wherein said pump is arranged for withdrawing, via said mixture outlet opening, said mixture from said reactor space and introducing, via said inflow conduit, said mixture into said reactor space; and
a temperature control arrangement, communicatively coupled for fluid flow to said pump, wherein said temperature control arrangement is arranged outside the reactor space for heating and/or cooling, in use, said mixture withdrawn from said reactor space to a predetermined temperature range before introducing, via said inflow conduit, said mixture into said reactor space,
wherein said reactor wall comprises at least one of:
a polymer;
a coating arranged for thermally insulating said reactor vessel and/or shielding said mixture from predetermined materials; and
replaceable wall elements arranged for realising a locally reinforced surface, and/or
wherein said reactor vessel comprises at least one of:
an upper side wall, wherein said upper side wall at least partly bounds said reactor space at an upper side thereof, wherein said upper side wall is provided with said gas outflow opening for allowing hydrogen originating from said mixture to exit, via said gas outflow opening, said reactor space; and
a lower side wall, wherein said lower side wall at least partly bounds said reactor space at a lower side thereof, wherein said mixture outflow opening is provided in said lower side wall.

3. A system for hydrogen production by dehydrogenation of formic acid (HCOOH), said system comprising:
a reactor vessel comprising a reactor space bound by a reactor wall, wherein said reactor vessel is arranged for holding a mixture of a catalyst and said formic acid in said reactor space, said reactor vessel further comprising a mixture inflow opening for allowing said mixture to enter, via said mixture inflow opening, said reactor space and a mixture outflow opening for allowing said mixture to exit, via said mixture outflow opening, said reactor space, and a gas outflow opening for allowing hydrogen originating from said mixture, via said gas outflow opening, to exit said reactor space;
an inflow conduit, communicatively coupled for fluid flow, via said mixture inflow opening, to said reactor space;
a pump, communicatively coupled for fluid flow, via said mixture inflow opening and said mixture outflow opening, to said reactor space, wherein said pump is arranged for withdrawing, via said mixture outlet opening, said mixture from said reactor space and introducing, via said inflow conduit, said mixture into said reactor space; and
a temperature control arrangement, communicatively coupled for fluid flow to said pump, wherein said temperature control arrangement is arranged outside the reactor space for heating and/or cooling, in use, said mixture withdrawn from said reactor space to a predetermined temperature range before introducing, via said inflow conduit, said mixture into said reactor space,
wherein at least one of:
said inflow conduit is arranged such that said mixture, in use, is introduced in said reactor space, via said mixture inflow opening, in a predetermined direction having a tangential component arranged for stirring, in use, said mixture in said reactor space;
said system further comprises a stationary flow organ arranged in said reactor space for disturbing a flow of stirring, in use, induced by introduction of said mixture in said reactor space via said inflow conduit, in said reactor space
said reactor vessel or said inflow conduit is provided with a further inflow opening arranged for introducing said formic acid in said reactor vessel; and
said reactor vessel is free from a mechanical stirrer.

4. The system according to claim 2, wherein said reactor vessel comprises said lower side wall and wherein said lower side wall partly bounds said reactor space at a bottom side thereof, and wherein said mixture outflow opening is provided in a centre part of said bottom side.

5. A method for hydrogen production by dehydrogenation of formic acid using a system according to claim 1, said method comprising the steps of:
providing said formic acid and said catalyst into said reactor space to provide a mixture of said formic acid and said catalyst inside the reactor space;

withdrawing, by said pump, said mixture of said formic acid and said catalyst from said reactor space;

heating and/or cooling, by said temperature control arrangement, said mixture to said predetermined temperature range outside the reactor space; and introducing, via said inlet opening, said heated and/or cooled mixture into said reactor space.

6. The method according to claim 5, wherein said catalyst comprises a complex of the formula:

$$M(L)n \qquad (I)$$

in which,

M is a metal selected from Ru, Rh, Ir, Pt, Pd, and Os;

n is in the range of 1-4;

L is a carbene, or a ligand comprising at least one phosphorus atom, said phosphor atom being bound by a complex bond to said metal, the phosphorus ligand further comprising at least an aromatic group and a hydrophilic group, wherein, if n>1, each L may be different from another L; and wherein the complex of formula (I) optionally comprises other ligands and is provided in the form of a salt or is neutral.

7. The method according to claim 5, wherein, during said step of heating and/or cooling, said predetermined temperature range is 20-200 degrees Celsius.

8. The method according to claim 7, wherein the predetermined temperature range is 70-150 degrees Celsius.

9. The system according to claim 2, wherein said reactor wall comprises said polymer and wherein said polymer is a plastic.

10. The method of claim 6, wherein M is Ru.

11. A method for hydrogen production by dehydrogenation of formic acid using a system according to claim 2, said method comprising the steps of:

providing said formic acid and said catalyst into said reactor space to provide a mixture of said formic acid and said catalyst inside the reactor space;

withdrawing, by said pump, said mixture of said formic acid and said catalyst from said reactor space;

heating and/or cooling, by said temperature control arrangement, said mixture to said predetermined temperature range outside the reactor space; and introducing, via said inlet opening, said heated and/or cooled mixture into said reactor space.

12. The method according to claim 11, wherein said catalyst comprises a complex of the formula:

$$M(L)n \qquad (I)$$

in which,

M is a metal selected from Ru, Rh, Ir, Pt, Pd, and Os;

n is in the range of 1-4;

L is a carbene, or a ligand comprising at least one phosphorus atom, said phosphor atom being bound by a complex bond to said metal, the phosphorus ligand further comprising at least an aromatic group and a hydrophilic group, wherein, if n>1, each L may be different from another L; and wherein the complex of formula (I) optionally comprises other ligands and is provided in the form of a salt or is neutral.

13. The method according to claim 11, wherein, during said step of heating and/or cooling, said predetermined temperature range is 20-200 degrees Celsius.

14. The method according to claim 13, wherein the predetermined temperature range is 70-150 degrees Celsius.

15. The method of claim 12, wherein M is Ru.

16. A method for hydrogen production by dehydrogenation of formic acid using a system according to claim 3, said method comprising the steps of:

providing said formic acid and said catalyst into said reactor space to provide a mixture of said formic acid and said catalyst inside the reactor space;

withdrawing, by said pump, said mixture of said formic acid and said catalyst from said reactor space;

heating and/or cooling, by said temperature control arrangement, said mixture to said predetermined temperature range outside the reactor space; and introducing, via said inlet opening, said heated and/or cooled mixture into said reactor space.

17. The method according to claim 16, wherein said catalyst comprises a complex of the formula:

$$M(L)n \qquad (I)$$

in which,

M is a metal selected from Ru, Rh, Ir, Pt, Pd, and Os;

n is in the range of 1-4;

L is a carbene, or a ligand comprising at least one phosphorus atom, said phosphor atom being bound by a complex bond to said metal, the phosphorus ligand further comprising at least an aromatic group and a hydrophilic group, wherein, if n>1, each L may be different from another L; and wherein the complex of formula (I) optionally comprises other ligands and is provided in the form of a salt or is neutral.

18. The method according to claim 15, wherein, during said step of heating and/or cooling, said predetermined temperature range is 20-200 degrees Celsius.

19. The method according to claim 18, wherein the predetermined temperature range is 70-150 degrees Celsius.

20. The method of claim 17, wherein M is Ru.

* * * * *